(12) United States Patent
Burton et al.

(10) Patent No.: US 7,537,150 B2
(45) Date of Patent: May 26, 2009

(54) APPARATUS AND METHOD FOR MEASURING LOADS ON A FRICTION STIR WELDING TOOL

(75) Inventors: Kurt A. Burton, Wildwood, MO (US); Mike P. Matlack, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 311 days.

(21) Appl. No.: 11/566,861

(22) Filed: Dec. 5, 2006

(65) Prior Publication Data

US 2008/0127751 A1 Jun. 5, 2008

(51) Int. Cl.
*B23K 20/12* (2006.01)

(52) U.S. Cl. .................. 228/2.1; 228/112.1; 228/114.5; 228/103

(58) Field of Classification Search .............. 228/112.1, 228/2.1, 114.5, 103
See application file for complete search history.

(56) References Cited

U.S. PATENT DOCUMENTS

| 5,460,317 | A | 10/1995 | Thomas et al. | |
|---|---|---|---|---|
| 2005/0006441 | A1 | 1/2005 | Adams et al. | |
| 2005/0040209 | A1 | 2/2005 | Stotler | |
| 2007/0034671 | A1* | 2/2007 | Burton et al. | 228/2.1 |
| 2007/0044901 | A1* | 3/2007 | Chen et al. | 156/182 |
| 2008/0308236 | A1* | 12/2008 | Chen et al. | 156/514 |

OTHER PUBLICATIONS

International Search Report, PCT/US2007/023598, Apr. 25, 2008.
Written Opinion, PCT/US2007/023598, Apr. 25, 2008.

* cited by examiner

*Primary Examiner*—Kiley Stoner
*Assistant Examiner*—Erin B Saad
(74) *Attorney, Agent, or Firm*—Alston & Bird LLP

(57) ABSTRACT

An apparatus and method are provided for measuring loads on a rotating friction stir welding tool of a friction stir welding machine. The apparatus includes a frame that can be connected to the friction stir welding machine, and rollers rotatably connected to the frame are structured to contact and rotate with the friction stir welding tool. Each roller is adapted to adjust in a respective direction and communicate with a respective load cell so that the load cells detect a positional characteristic of the rollers and measure loads applied to the rotating friction stir welding tool during operation. The rollers can contact the rotating tool directly during operation of the machine, such as while the rotating tools is being moved through a workpiece to form a friction stir weld joint, to measure the loads on the tool in the direction of movement of the tool and a direction normal to the movement, i.e., the path and path normal directions.

9 Claims, 11 Drawing Sheets

APPARATUS AND METHOD FOR MEASURING LOADS ON A FRICTION STIR WELDING TOOL

BACKGROUND OF THE INVENTION

1) Field of the Invention

Embodiments of the present invention relate to apparatuses and methods for measuring loads on a friction stir welding tool of a friction stir welding machine and, in particular, for measuring the loads on the tool during operation of the machine.

2) Description of Related Art

Friction stir welding is a process in which a rotating tool is urged into and/or through a workpiece, e.g., to join multiple members of the workpiece in a solid state or to repair cracks in a workpiece. One conventional friction stir welding machine includes a spindle that holds the rotatable tool. The spindle rotates the tool and moves the tool along a desired path through the workpiece. The tool can define a shoulder that is urged against the workpiece during welding and a pin-like portion that extends from the shoulder into the workpiece. In some cases, the tool can also define threads or other contours on its outer surface. As the tool is urged through the workpiece, a continuous weld joint can be formed. For example, during one conventional friction stir welding process, the rotating tool is plunged into a workpiece or between two workpieces by a friction stir welding machine to produce the required resistance force to generate sufficient frictional heating to form a region of plasticized material. The longitudinal axis of the tool is typically held normal to the surface of the workpiece (or at a small angle relative to the normal direction so that the trailing edge of the shoulder is thrust into and consolidates the plasticized material). Upon solidification of the plasticized material, the members of the workpiece are joined along the weld joint. Friction stir welding is further described in U.S. Pat. No. 5,460,317 to Thomas et al., the contents of which are incorporated herein by reference.

The loads or magnitude of forces exerted by the friction stir welding machine for moving the tool through the workpiece must be maintained above a prescribed minimum in order to generate the required frictional heating. The various loads provided between the tool and the workpiece can be affected by the rotational speed of the tool, the rate at which the tool is translated through the workpiece, the temperature of the tool and workpiece, the size and material properties of the workpiece, and the size and geometry of the tool. For example, threads or other contours provided on the outer surface of the tool can affect both the loads experienced between the tool and workpiece as well as the degree of mixing of the material of the workpiece during welding. In some cases, the forces on the welding tool can be significant, and deviations from optimal loading conditions can affect the quality of the resulting weld joints, the speed at which the joints are formed, and the longevity of the welding tool and welding machine.

In one typical welding operation, the welding machine includes an automated controller that moves the tool along a predetermined path through the workpiece. The controller is programmed to provide certain welding parameters, e.g., a predetermined radial load on the tool, a predetermined axial load on the tool, a predetermined rotational speed, and a predetermined speed of translation through the workpiece. That is, the machine can exert a load of a predetermined force (e.g., in pounds) on the tool in the axial direction of the tool toward the workpiece, rotate the tool at a predetermined speed (e.g., in RPM), and move the tool through the workpiece at a predetermined speed (e.g., in inches per second). Due to variations in welding conditions, such as variations in the thickness or material of the workpiece or geometric variations throughout the workpiece and the welding path, the loads that result between the tool and the workpiece can change significantly during a single welding operation. Thus, the optimum axial load, rotational speed, and translational speed may vary throughout the operation. In some cases, the controller can be programmed to change the welding parameters during the operation in an attempt to adjust for variations. Such welding programs can require complex determinations based on the characteristics of a specific workpiece.

In some cases, the machine can also include internal sensors that detect characteristics of the machine that are indicative of the loading on the tool. For example, the sensors may measure a hydraulic pressure in a hydraulic actuation system that moves the tool and attempt to use that pressure to determine a loading condition on the tool. In order to correlate the output of the sensor with the actual loads on the tool, a "static" calibration operation can be performed by urging the tool against a load measurement device so that the output of the sensor can be calibrated with the output of the load measurement device. Such "static" calibration operations are performed with the tool in a non-operational condition. That is, the tool is neither rotating nor welding when urged against the load measurement device. For a machine calibrated in this way, discrepancies generally exist between the true loads on the tool during operation and the loads determined by the machine's internal sensors.

Thus, there is a need for an improved apparatus and method for measuring loads on a friction stir welding tool of a friction stir welding machine. The apparatus should be capable of measuring the loads that are actually applied to the tool and should be capable of measuring the loads during operation of the machine, i.e., while the tool is rotating and/or the tool is being used to perform a welding operation.

SUMMARY OF THE INVENTION

Embodiments of the present invention provide an apparatus and method for measuring loads on a rotating friction stir welding tool of a friction stir welding machine. The apparatus is capable of contacting the tool to measure the loads that are applied at the tool. Further, the apparatus can be used during operation of the machine, i.e., while the tool is rotating and/or moving through a workpiece, to measure the loads applied in the direction of movement of the tool and a direction normal to the movement, i.e., the "path" and "path normal" directions.

According to one embodiment, the apparatus includes a frame configured to be connected to a friction stir welding machine. First and second rollers are rotatably connected to the frame and structured to contact and rotate with the friction stir welding tool. The first and second rollers are adapted to adjust in first and second directions, each direction being generally perpendicular to a longitudinal direction of the tool. For example, the first roller can be rotatably connected to a first rail that is slidably mounted to the frame and constrained to adjust in the first direction, and the second roller can be rotatably connected to a second rail that is slidably mounted to the frame and constrained to adjust in the second direction, so that loads applied to the tool in the first and second directions are transmitted by the rails to the first and second rollers, respectively. First and second load cells communicate with the rollers. Each load cell is adapted to detect a positional characteristic of a respective one of the rollers along a respective one of the first and second directions. Thus, the load cells are configured to measure loads applied to the rotating friction stir welding tool during operation. The first and second directions can be perpendicular so that the first load cell is configured to measure a load applied in a direction of movement of the tool through a workpiece (path direction) and the second load cell is configured to measure a load applied in a direction normal to the direction of movement (path normal direction).

According to one aspect of the present invention, each rail extends between first and second ends and is configured to slide in a track mounted to the frame, a respective one of the rollers being mounted to the first end of each rail and the second end of each rail configured to contact a respective one of the load cells. A first adjustment member can be configured to be adjusted to thereby adjust the position of the first roller along the first direction and the distance between the first roller and the first load cell, and a second adjustment member can be configured to be adjusted to thereby adjust the position of the second roller along the second direction and the distance between the second roller and the second load cell.

The frame can be removably connected to the machine by one or more releasable fasteners. Further, the friction stir welding machine can be provided to define one or more mounting features for releasable engagement with the frame. The friction stir welding machine, which includes the rotatable friction stir welding tool, can also have one or more sensors for detecting a load applied to the tool, such as internal, nonremovable sensors that can be calibrated with the measurements taken by the load cells.

According to another embodiment, a method is provided for measuring loads on a rotating friction stir welding tool of a friction stir welding machine during operation of the machine. The method includes connecting a frame to the friction stir welding machine so that first and second rotatable rollers are disposed against the tool. The friction stir welding machine is operated so that the friction stir welding tool rotates and thereby rotates the first and second rollers. For example, the rotating friction stir welding tool can be moved through a workpiece in a direction of movement to thereby friction stir weld the workpiece. A first load applied to the first roller in a first direction generally perpendicular to a longitudinal direction of the tool is measured, and a second load applied to the second roller in a second direction generally perpendicular to the longitudinal direction of the tool is measured, e.g., by measuring the loads applied to first and second load cells in the respective directions, one of which can be in the direction of movement of the tool through the workpiece and the other of which can be normal to the direction of movement.

The first and second rollers can be adjustable in the first and second directions, respectively, so that the first and second rollers are disposed against the tool. For example, each roller can be connected to a rail that is slidably adjusted relative to the tool, and each rail can be connected to a respective first or second load cell. That is, the first roller can be rotatably connected to a first rail that is constrained to adjust in the first direction so that loads applied to the tool in the first direction are transmitted via the first roller and the first rail to the first load cell. Similarly, the second roller can be rotatably connected to a second rail that is constrained to adjust in the second direction, the second roller rotatably connected to the second rail such that loads applied to the tool in the second direction are transmitted via the second roller and second rail to the second load cell. First and second adjustment members can also be configured to adjust the position of the first and second rollers in the first and second directions, respectively, relative to the load cells.

The frame of the apparatus can be releasably connected to the friction stir welding machine with one or more releasable fasteners and then removed from the friction stir welding machine after the measuring operation. In some cases, the friction stir welding machine can define one or more one sensors for detecting a load applied to the tool, and the method can include calibrating the sensor(s) of the friction stir welding machine according to the first and second loads that are applied to the rollers and measured by the apparatus, e.g., so that the sensors can be used to provide an accurate measurement after the apparatus is removed from the machine.

BRIEF DESCRIPTION OF THE DRAWINGS

Figure 1:
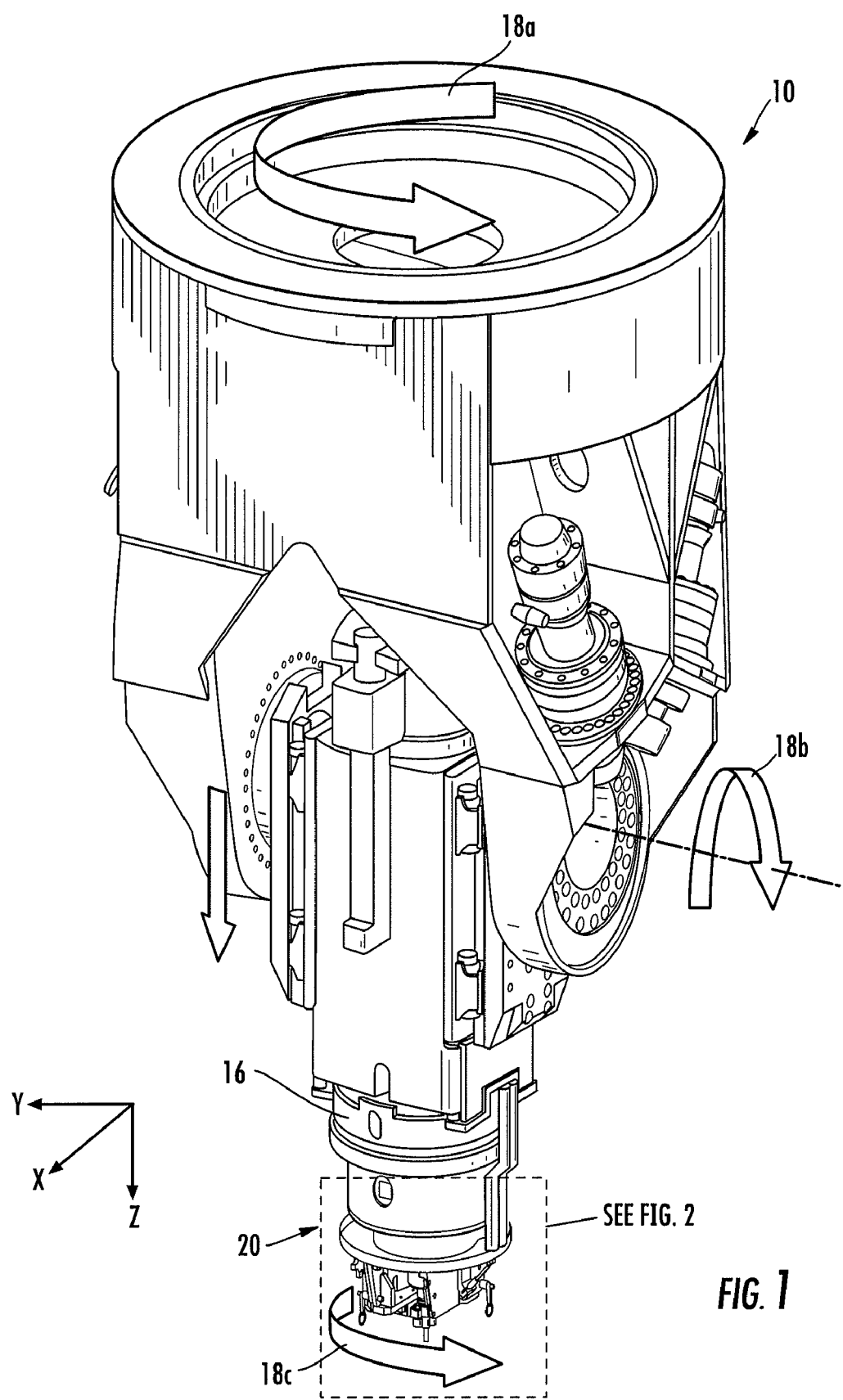
Figure 2:
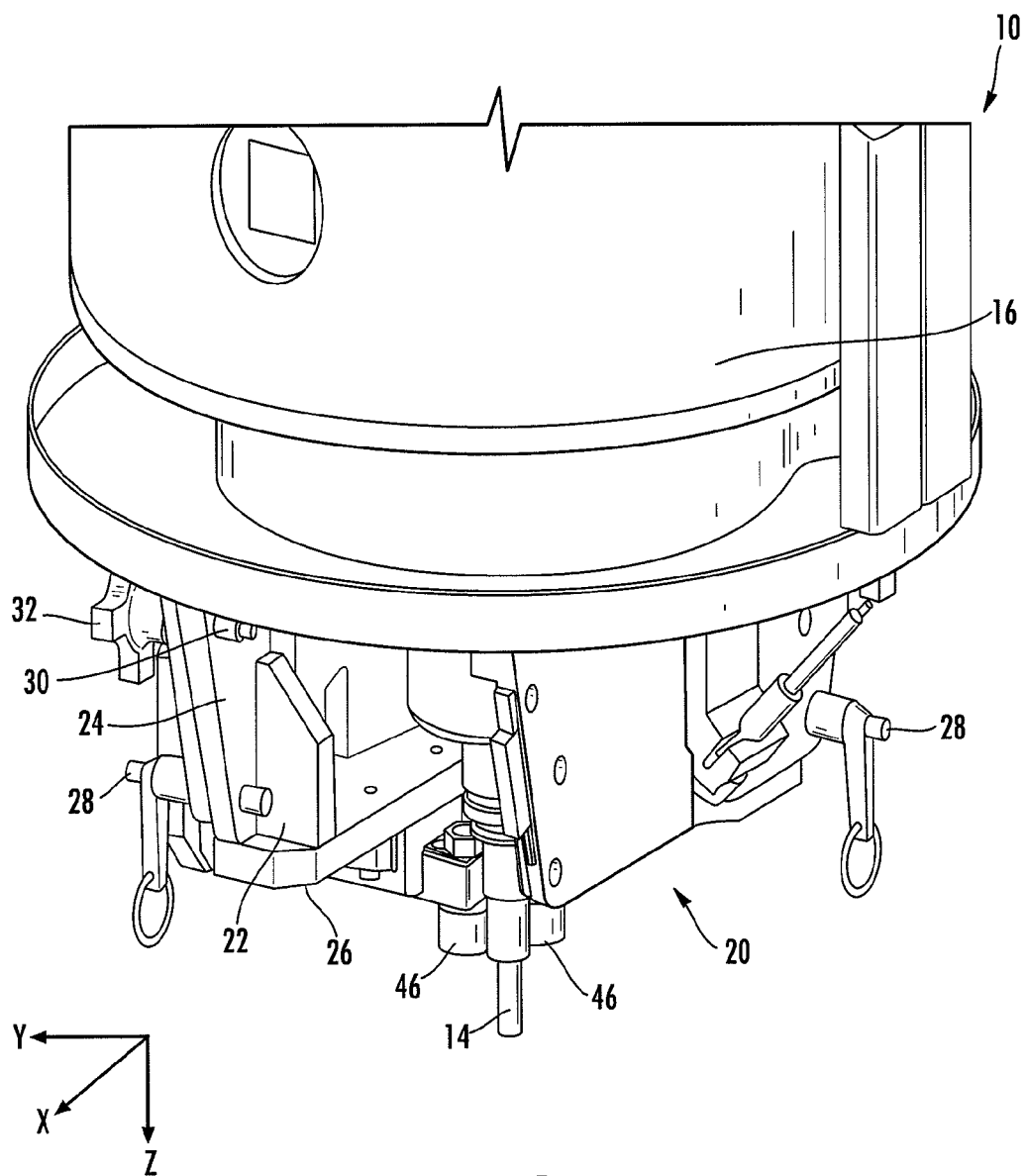
Figure 3:
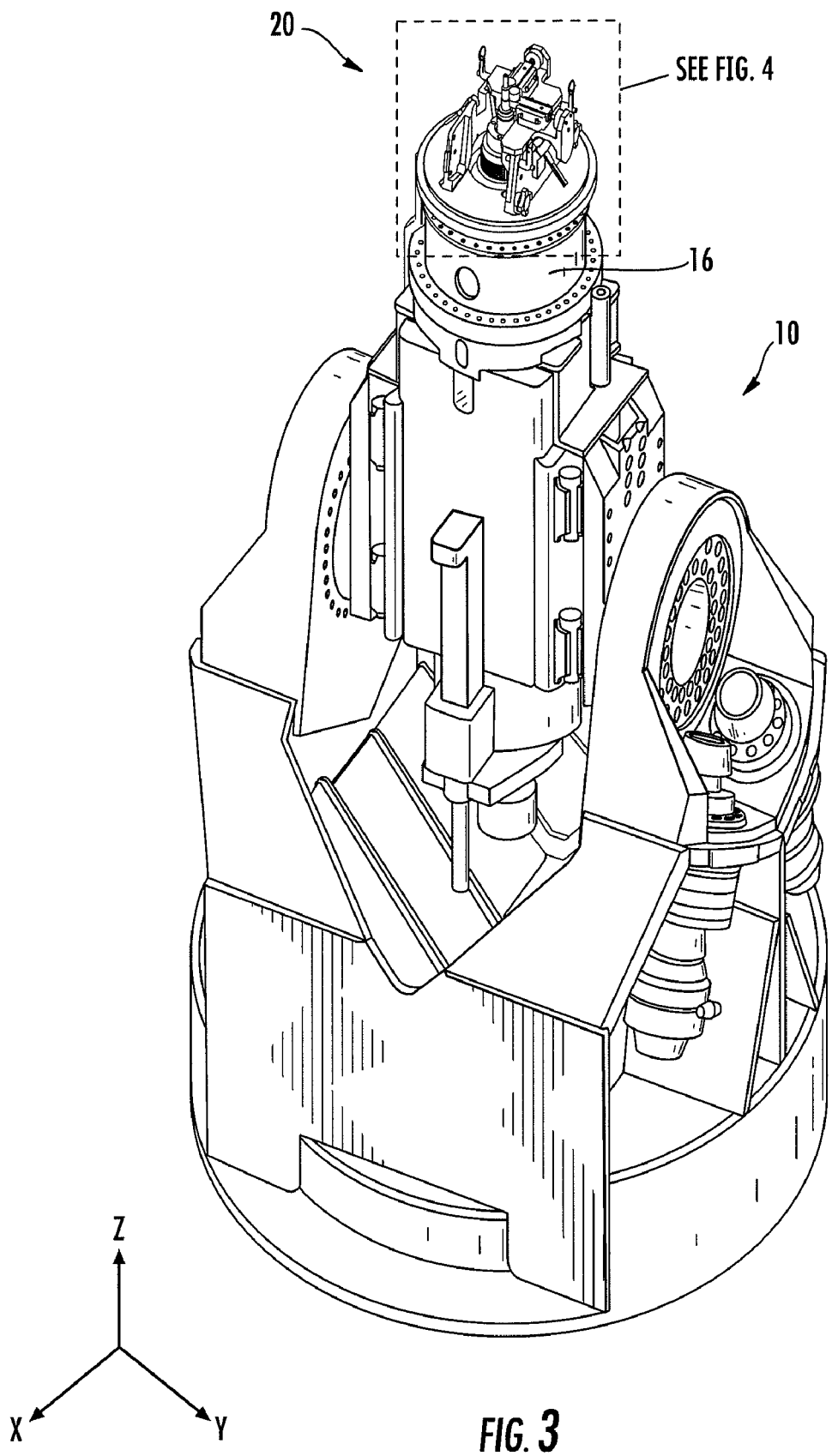
Figure 4:
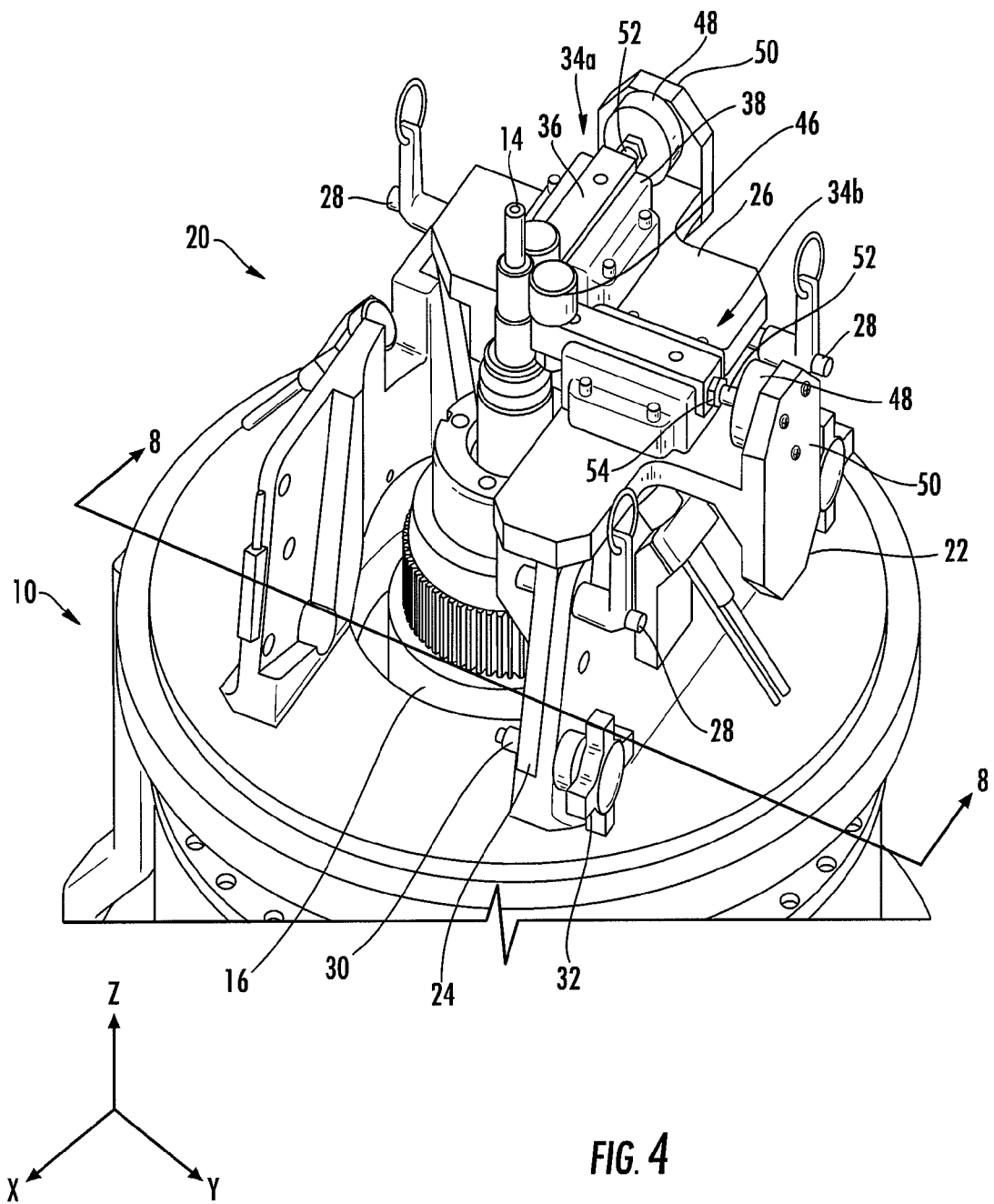
Figure 5:
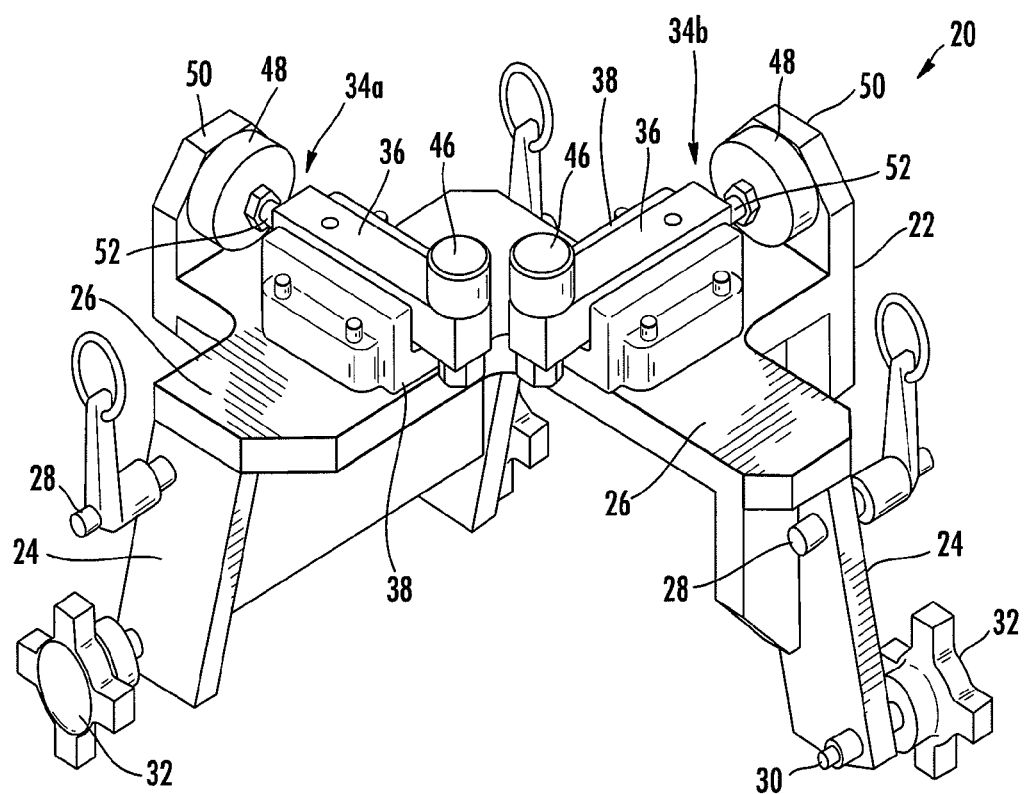
Figure 6:
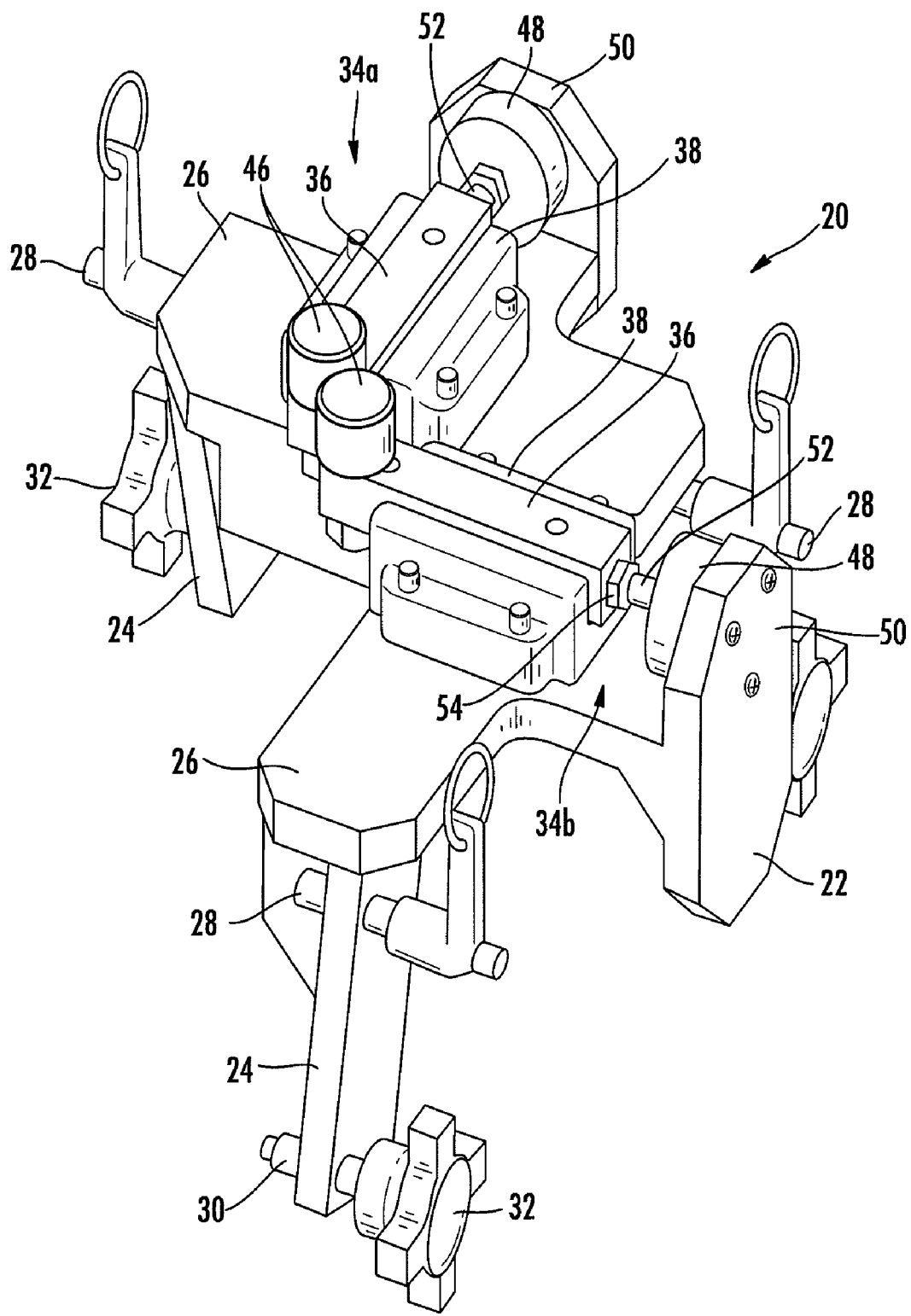
Figure 7:
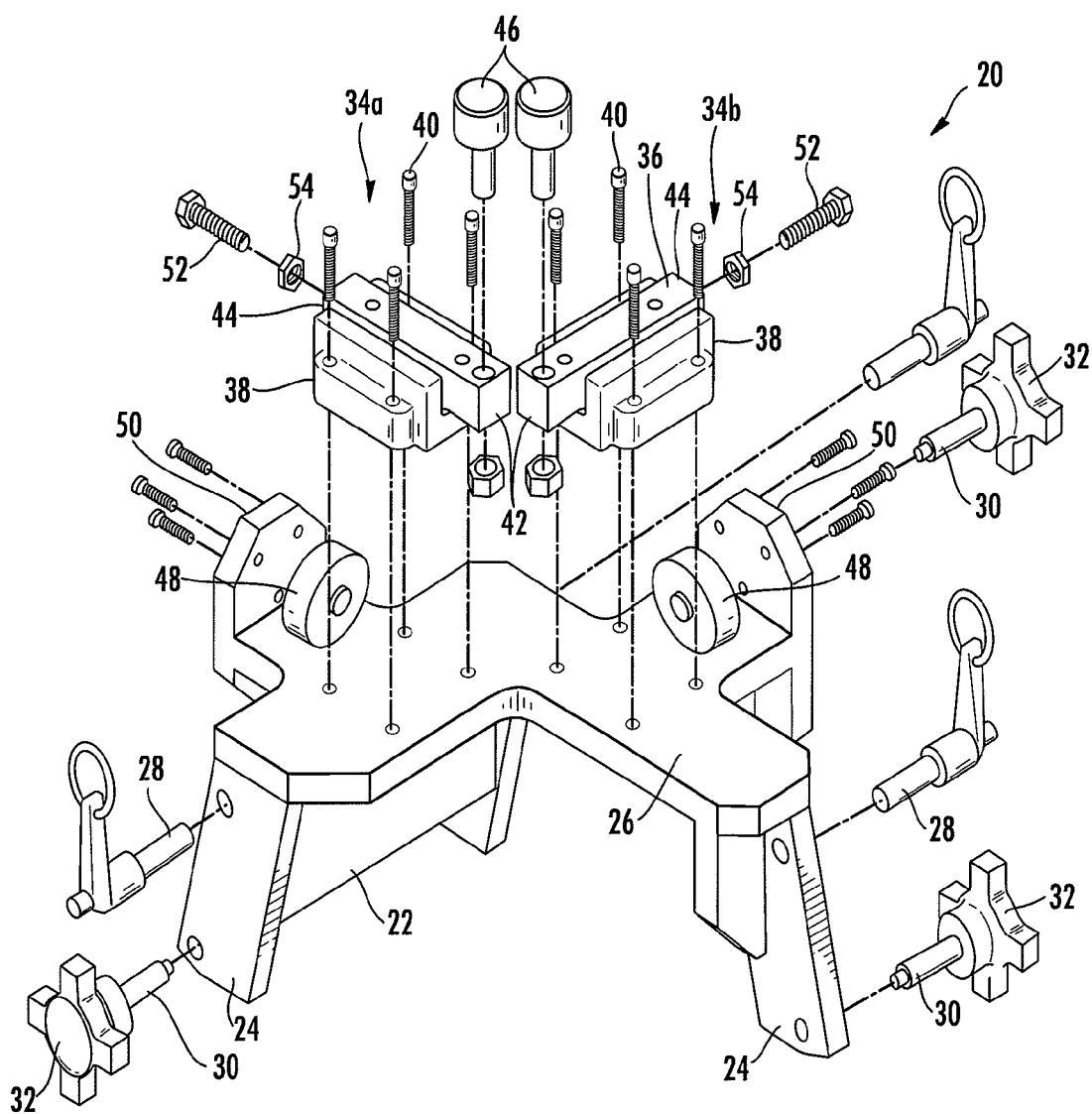
Figure 8:
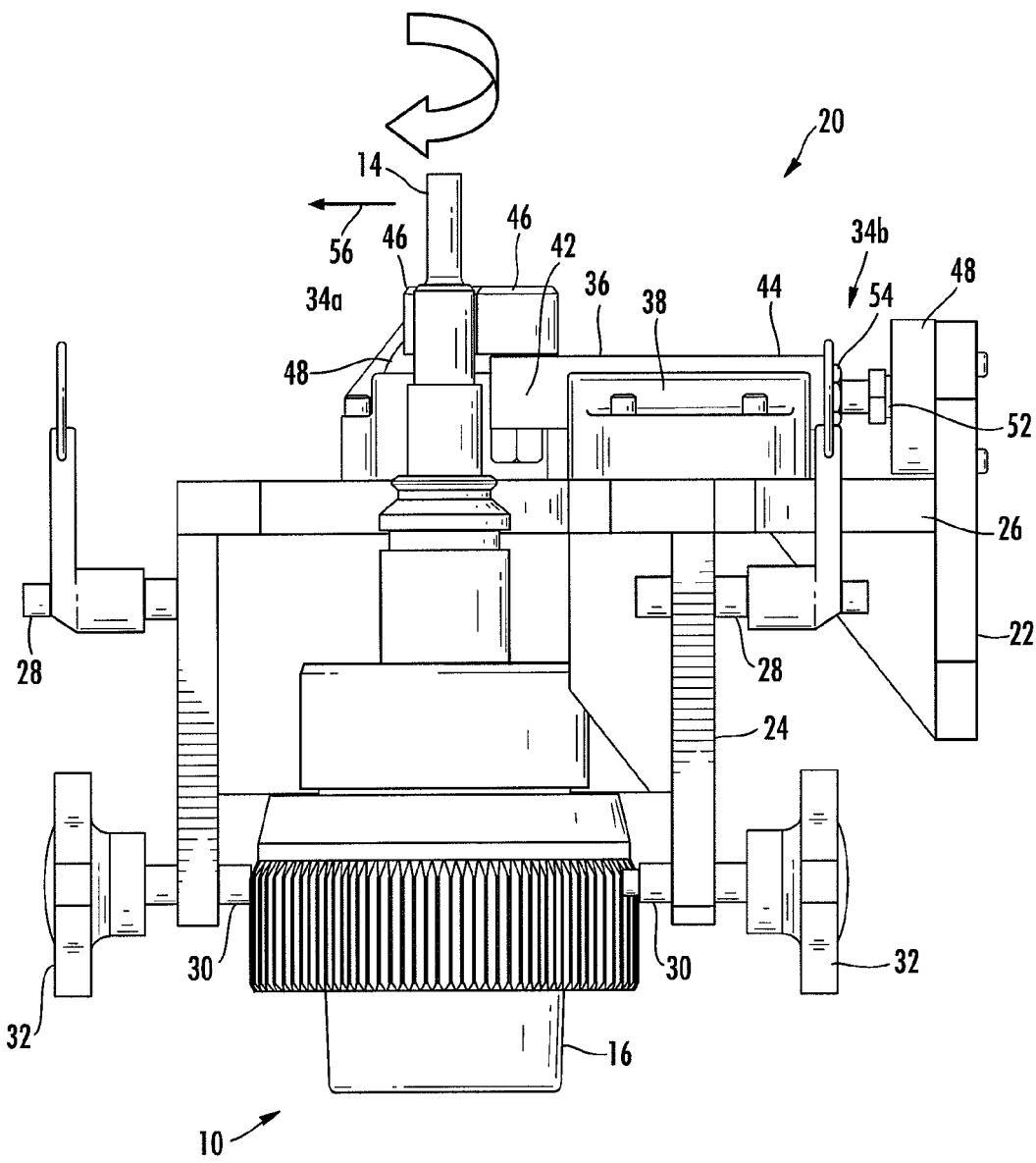
Figure 9:
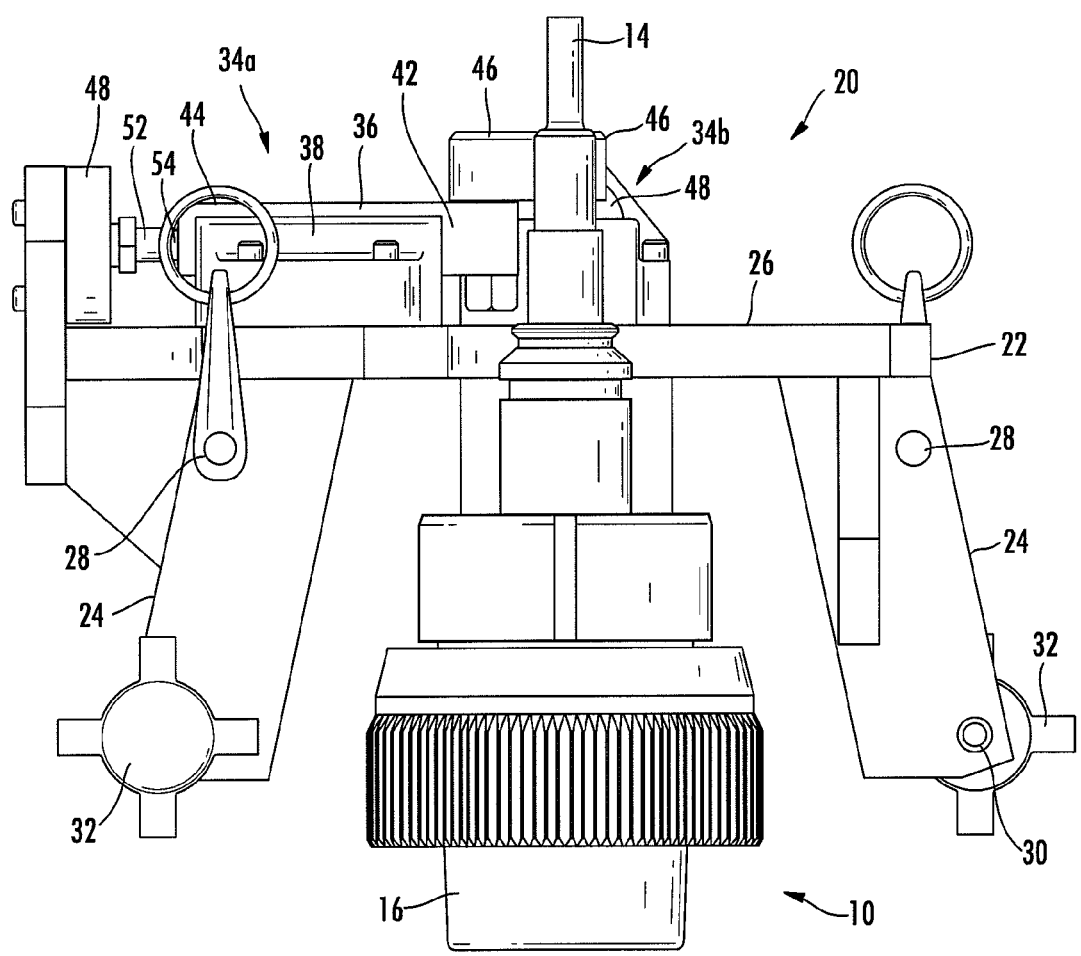
Figure 10:
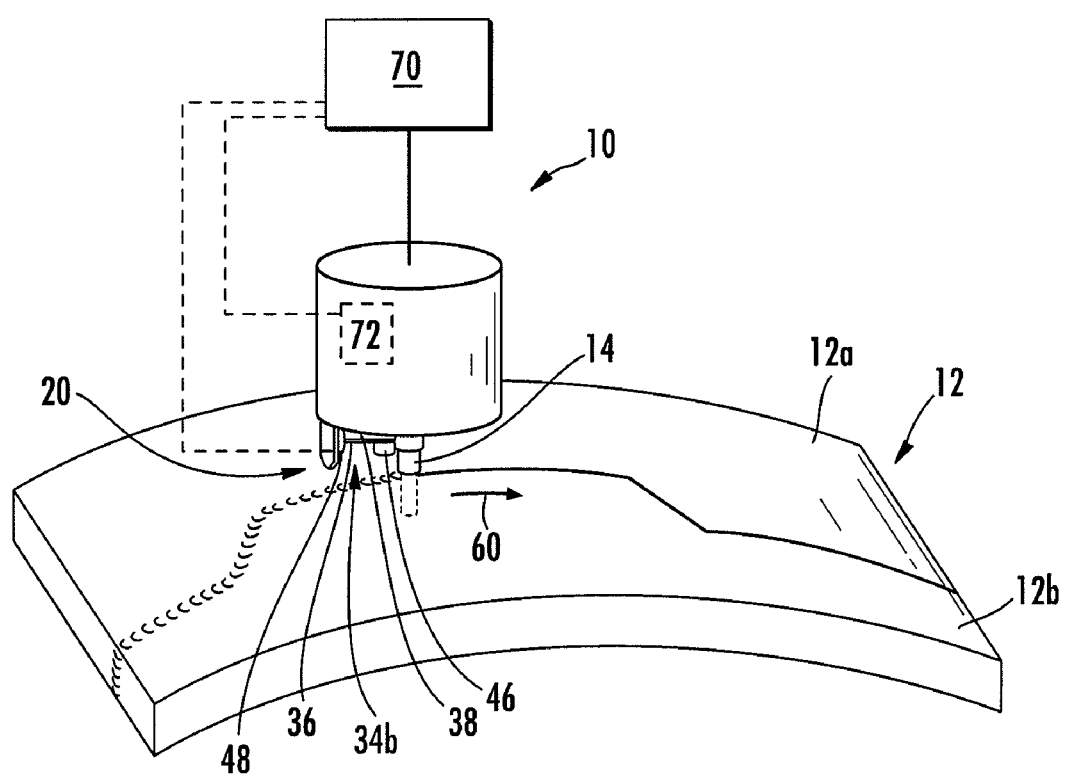
Figure 11:
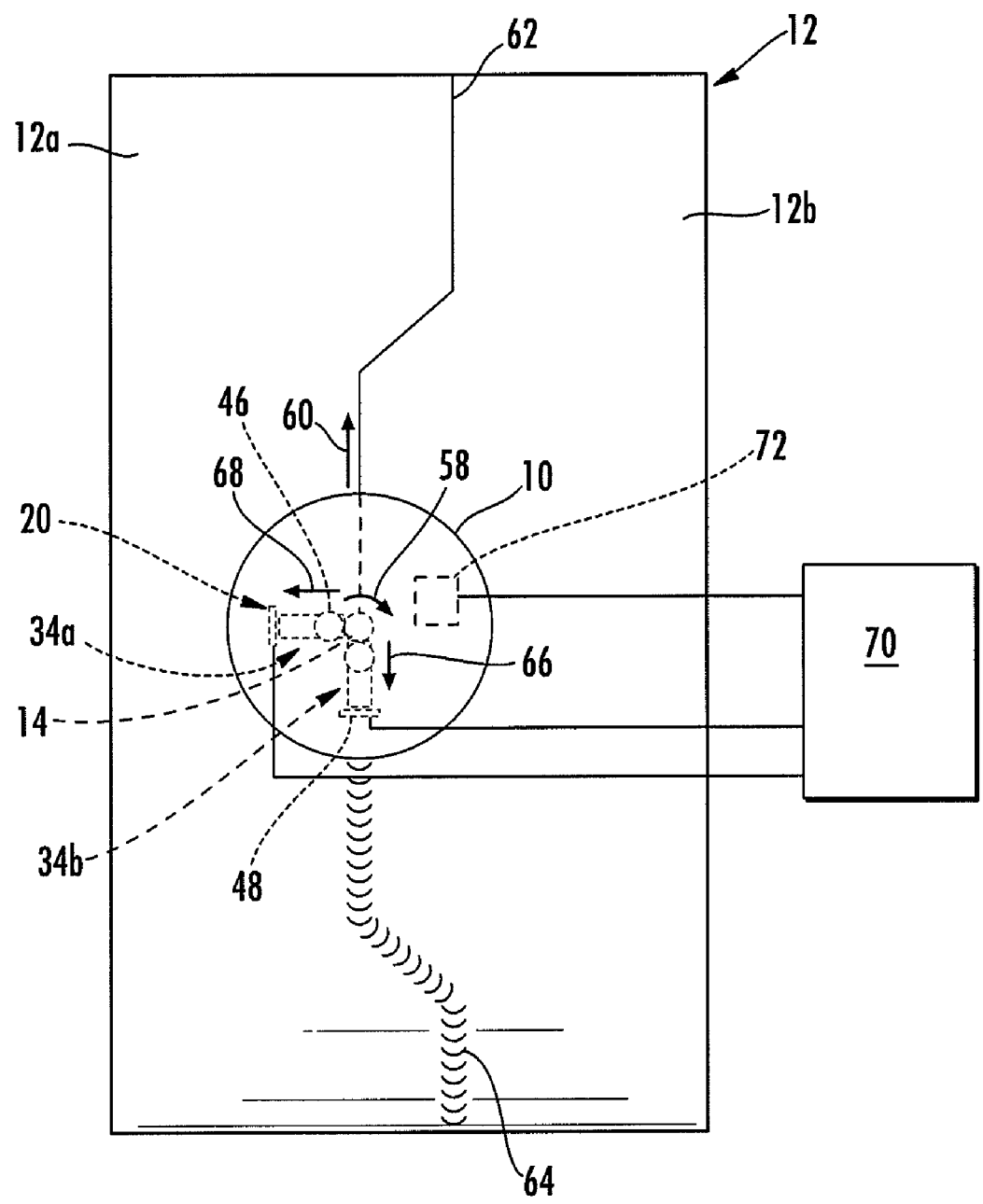

Having thus described the invention in general terms, reference will now be made to the accompanying drawings, which are not necessarily drawn to scale, and wherein:

FIG. 1 is a perspective view illustrating a friction stir welding machine with an apparatus mounted thereto for measuring the loads on the tool of the machine according to one embodiment of the present invention;

FIG. 2 is a perspective view illustrating a portion of the friction stir welding machine of FIG. 1 as indicated in FIG. 1;

FIG. 3 is another perspective view illustrating the friction stir welding machine of FIG. 1;

FIG. 4 is a perspective view illustrating a portion of the friction stir welding machine of FIG. 1 as indicated in FIG. 3;

FIGS. 5 and 6 are perspective views illustrating the apparatus of FIG. 1 for measuring loads on the tool of a friction stir welding machine;

FIG. 7 is a perspective view illustrating the apparatus of FIG. 1 in a partially assembled condition;

FIG. 8 is a partial cut-away view illustrating the apparatus of FIG. 1 as generally seen in elevation along line 8-8 of FIG. 4;

FIG. 9 is a partial cut-away view illustrating the apparatus of FIG. 1 as generally seen in elevation in a direction perpendicular to FIG. 8;

FIG. 10 is a perspective view schematically illustrating the friction stir welding machine and apparatus for measuring the loads on the tool of the machine of FIG. 1 during a friction stir welding operation; and FIG. 11 is a plan view schematically illustrating the friction stir welding machine and apparatus of FIG. 10.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to the drawings and, in particular, to FIGS. 1-4, there is shown a friction stir welding machine 10 for friction stir welding a workpiece 12 (FIGS. 10 and 11). According to one embodiment of the present invention, an apparatus 20 is mounted to the friction stir welding machine 10 for measuring the forces or loads on a tool 14 of the machine 10. The friction stir welding machine 10, which can be a generally conventional device, includes a spindle 16 with multiple actuators for rotating the tool 14 and moving the tool 14 into and through a workpiece 12. Further, the spindle 16 can be moved along the workpiece 12 by one or more additional actuation devices, such as a Computer Numerical Control (CNC) device. The machine 10 can be operated manually but is typically configured for automatic operation, i.e., with the spindle 16 and/or the CNC device controlled by a controller that operates the various actuators to move the tool 14 along a predetermined weld path according to a predetermined welding software program. As the spindle 16 is moved along the workpiece 12, the tool 14, which is secured to the spindle 16, is also moved. In particular, the CNC device can move the spindle 16, and hence the tool 14, along the X-, Y-, and Z-axes. Further, the CNC device can rotate the tool 14 about the C-axis, i.e., as indicated by reference numeral 18a. The spindle 16 can also include actuators for rotating about the A-axis, indicated by reference numeral 18b, and the E-axis, indicated by reference numeral 18c, in addition to rotating the tool 14 about the longitudinal axis of the tool 14.

As shown, for example, in FIG. 4, the apparatus 20 is mounted to the spindle 16 proximate to the rotatable tool 14 and configured to contact the tool 14. The apparatus 20 is shown removed from the friction stir welding machine 10 in FIGS. 5-7. The apparatus 20 generally includes a frame or structure 22, which corresponds to the configuration of the friction stir welding machine 10 near the tool 14. In particular, the frame 22 includes a base portion 24 defining several leg-like supports that, when disposed against a face surface of the spindle 16 of the friction stir welding machine 10, support a table-like portion 26 of the frame 22 at a position near the tool 14.

The frame 22 is typically removably connected to a weldment or structure that is connected (e.g., removably connected) to the spindle 16 of the machine 10 so that the apparatus 20 can be connected to the machine 10 for a calibration operation and then removed from the machine 10. Thereafter, the machine 10 can be operated without the apparatus 20, and the apparatus 20 can be used for calibrating another machine 10. For example, the frame 22 of the apparatus 20 can be removably connected or mounted to the machine 10 using one or more releasable fasteners, such as pins, bolts, clamps, or the like. As illustrated, locating pins 28 are disposed through apertures defined by the frame 22 and through corresponding apertures defined by the friction stir welding machine 10. Thus, the frame 22 can be arranged on the friction stir welding machine 10 as shown in FIG. 4 and each pin 28 can be disposed through the corresponding holes of the frame 22 and machine 10 to secure the frame 22 to the machine 10 in the desired orientation. Further, additional fasteners provided for securing the frame 22 in place can include spring-loaded pins, or bolts 30 with handknobs 32 disposed in threaded holes of the frame 22 so that an operator can rotate the handknobs 32 to tighten the bolts 30 against the machine 10 or into corresponding threaded or unthreaded holes of the machine 10. In some cases, the apparatus 20 can limit one or more of the various operational motions of the machine 10, while in other cases the machine 10 can operate to move in any of its movements regardless of the apparatus 20 mounted thereon.

Alternatively, in other embodiments of the present invention, the apparatus 20 can be provided as a nonremovable, i.e., integral, part of the machine 10 that cannot be easily removed therefrom. For example, the apparatus 20 can be made nonremovable by welding or otherwise fixedly securing the frame 22 of the apparatus 20 to the machine 10.

At least one load measurement mechanism 34a, 34b is mounted on the table-like portion 26 of the frame 22. In the illustrated embodiment, two load measurement mechanisms 34a, 34b are provided, each including a member that is adjustably mounted on the frame 22. In particular, each load measurement mechanism 34a, 34b includes a rail 36 that is slidably mounted in a track or guide 38. The track 38 is mounted or otherwise secured to the frame 22, e.g., by bolts 40 or otherwise, and defines a slot for receiving the rail 36. The rail 36 is disposed in the slot such that the track 38 constrains the rail 36 to slide or otherwise adjust along one direction of motion. As shown in FIGS. 8 and 9, each rail 36 extends between first and second ends 42, 44. A rotatable roller 46 is mounted to the first end 42 of each rail 36 so that an outer surface of the roller 46 extends beyond the rail 36 to directly contact the tool 14. At the second end 44 of the rail 36, opposite the roller 46, the rail 36 is connected to a respective load cell 48 that is secured to a flange 50 of the frame 22 and configured to measure loads transmitted by the tool 14 through the roller 46 and rail 36. That is, with the rollers 46 disposed against the tool 14, any loading of the tool 14 in the direction of the respective roller 46 is transmitted directly from the tool 14 to the roller 46 and via the respective rail 36 to the respective load cell 48 for measurement by the cell 48. If the tool 14 is loaded in the directions of both rollers 46, i.e., with a load directed in a direction that is not parallel to either of the first and second directions, each of the load cells 48 can detect the portion or component of the total loading on the tool 14 that is applied in the respective direction.

Each load roller 46 is mounted to the respective rail 36 rotatably so that the roller 46 can rotate against the tool 14, i.e., against the same integral member that is rotated and urged into or along the workpiece 12 for welding. In this way, the roller 46 can be in direct contact with the tool 14 while the tool 14 is rotating so that the roller 46 is rotated by the tool 14. Each roller 46 can include a bearing or other rotatable mount. Such direct contact or engagement between the tool 14 and the rollers 46 can facilitate a measurement of the loading on the tool 14 that is more accurate than other measurements in which the loads are determined based on correlations between the loading of the tool and the output of a sensor that is not directly connected to the tool 14. Further, the measurement of the loading during operation of the machine 10 can facilitate a measurement of the loading on the tool 14 that is more accurate than other measurements in which the operating loads are determined based on measurements performed on a static tool.

The rails 36 can also be supported by bearings or other low-friction adjustment devices so that forces are transmitted efficiently between the tool 14 and the load cells 48. That is, each track 38 can be a roller bearing that permits low-friction motion of the respective rail 36 only along a single direction of motion.

Various types of load cells 48 can be used. Typically, each load cell 48 is adapted to detect a positional characteristic of the roller to thereby detect a load or force on the respective roller 46 along the direction of the respective track 38 and rail 36. For example, each load cell 48 can detect small changes in force, displacement, stress, strain, pressure, or the like and provide an output signal that is representative of the load, i.e., force, applied thereto. One exemplary load cell 48 that can be used in the present invention is the Model 53 load cell with readout, available from Sensotec—Lebow products, part of Honeywell Sensing and Control, Part No. 060-0239-08 with a range of 10,000 lbs.

An adjustment member can also be provided between the rail 36 and the load cell 48 to adjust the distance between each roller 46 and the associated load cell 48 so that the roller 46 is disposed in contact with the tool 14 but without significant compression of the roller 46 and rail 36 when the tool 14 is not loaded. For example, as shown in FIGS. 5-7, a screw or bolt 52 is disposed in a threaded aperture of each rail 36 at the second end 44 thereof. With the tool 14 stopped and unloaded, an operator can easily rotate the bolt 52 to adjust the length by which the bolt 52 extends from the rail 36, so that the roller 46 contacts the tool 14 and the head of the bolt 52 contacts the load cell 48 without applying any significant load on the load cell 48 (e.g., about 1 lb or less). A nut 54 provided on the bolt 52 can be adjusted against the rail 36 to secure the bolt 52 in the adjusted configuration relative to the rail 36 and prevent the bolt 52 from rotating during operation.

In the illustrated embodiment, the apparatus 20 includes two load measurement mechanisms 34a, 34b. The rails 36 of the two load measurement mechanisms 34a, 34b are configured to slidably adjust in directions that are perpendicular to the axial or longitudinal direction of the tool 14. Further, the rails 36, and hence the rollers 46, are configured to adjust in directions that are normal to one another. That is, as shown in FIG. 4, the axial direction of the tool 14 extends in the direction of the Z-axis, and the rails 36 are configured to adjust relative to the frame 22 in the directions of the X- and Y-axes, respectively. Thus, the two load measurement mechanisms 34a, 34b of the apparatus 20 can be used to determine the total load applied to the tool 14 as the tool 14 is moved through the workpiece 12. For example, if the tool 14 is moved through a workpiece 12 in the direction 56 (FIG. 8), the load cell 48 of one load measurement mechanism 34b can determine the load applied to the tool 14 in the opposite, parallel direction. The load cell 48 of the other load measurement mechanism 34a can further determine any loads applied in a direction normal to direction 56 (i.e., in a direction into the page in FIG. 8). Thus, the apparatus 20 is capable of determining the loads applied both in a direction of movement of the tool 14 along the welding path and in a direction perpendicular thereto, i.e., the path and path normal directions.

FIGS. 10 and 11 illustrate the use of the apparatus 20 for measuring the loads on the rotating tool 14 of the friction stir welding machine 10 while the machine 10 is performing a friction stir welding operation to join two members 12a, 12b of a workpiece 12. As indicated in FIG. 11, the tool 14 of the machine 10 rotates in direction 58, and the tool 14 is moved in direction 60 through the workpiece 12 along an interface 62 of the two abutting members 12a, 12b of the workpiece. As the tool 14 moves through the workpiece 12, the rotating tool 14 generates friction with the workpiece, thereby plasticizing material of the workpiece. The plasticized material is mixed by the tool 14 and thereafter cools and solidifies to form a friction stir welded joint 64. The workpiece 12 and the weld path can define various contours and configurations, including complex curves about multiple axes. The direction and orientation of the tool 14 can be modified accordingly while performing a welding operation, e.g., by changing the direction of the tool 14 through the workpiece 12 in the X- and Y-axes (FIG. 11) and/or by changing the orientation of the tool 14, e.g., by rotating the of the tool 14 to correspond to the curvature of the workpiece 12 (FIG. 10).

As the tool 14 moves through the workpiece 12, loads applied to the tool 14 are also applied via the rails 36 to the load cells 48. For example, as the tool 14 moves in direction 60 in FIG. 11, a load is applied to the tool 14, and hence to the load cell 48 of mechanism 34b, in the opposite parallel direction 66. Some loading (typically of a smaller magnitude) can also occur in a path normal direction 68 toward the roller 46 of the other mechanism 34a and is detected by the load cell 48 of the mechanism 34a. Each load cell 34a, 34b is configured to generate load signals and communicate the load signals to a controller 70 and/or another interface such as a calibrated read-out that includes a digital LED display for displaying the load signals to a user.

The motion of the tool 14 through the workpiece 12 is controlled by a controller, which includes a processor and a memory, and which can be the same controller 70 that receives the load signals from the load cells 48 (as illustrated) or a separate control device. The controller 70 controls the motions and other operations of the machine 10. In particular, the processor of the controller 70 can provide commands for controlling the actuators of the machine 10 according to a weld program, i.e., a predetermined list of computer program instructions, which can be stored in the memory of the controller 70 as software. In this way, the processor controls the tool 14 to move along a weld path that corresponds to the interface 62. Further, the processor can control the tool 14 to move according to a variety of welding parameters such as the loads exerted by or on the tool 14. For example, the weld program can include instructions for controlling the speed or other aspect of the movement of the tool 14 to maintain a particular load (or particular range of loads) on the tool 14. In some cases, the load (or range of loads) can vary throughout the welding operation, e.g., according to the material or other characteristics of the workpiece 12. In this regard, the controller 70 can receive the load data measured by the load cells 48 and adjust the motion of the tool 14 accordingly, e.g., by increasing the speed at which the tool 14 moves through the workpiece 12 to increase the load on the tool 14 or decreasing the speed at which the tool 14 moves through the workpiece 12 to decrease the load on the tool 14. In some cases, the controller 70 can mathematically combine the loads determined by the different cells 48 to determine a single magnitude and direction that is representative of the total load applied to the tool 14.

Further, the controller 70 can also receive load data provided by the friction stir welding machine 10, e.g., data generated by sensors 72 provided within and integral to the machine 10. Such sensors 72 can detect pressures, stresses, strains, and the like and thereby determine the loads on the tool 14. The controller 70 can compare the signals provided by the load cells 48 with the machine's internal sensors 72. Further, the controller 70 can calibrate (or provide an output that can be used by an operator to calibrate) one or more of the machine's internal sensor(s) 72. In this way, the apparatus 20 can facilitate the calibration of the integral sensor(s) 72 of the machine 10 so that subsequent measurements by each integral sensor 72 of the machine 10 are sufficiently accurate. Such a calibration operation is typically performed on new friction stir welding machines and can also be performed periodically to maintain the accuracy of the machine's internal sensors 72.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for measuring loads on a rotating friction stir welding tool of a friction stir welding machine during operation of the machine, the apparatus comprising:
a frame configured to be connected to the friction stir welding machine;

first and second rollers rotatably connected to the frame and structured to contact and rotate with the friction stir welding tool, the first roller adapted to adjust in a first direction generally perpendicular to a longitudinal direction of the tool, and the second roller adapted to adjust in a second direction generally perpendicular to the longitudinal direction of the tool; and first and second load cells in communication with the rollers, the first load cell adapted to detect a positional characteristic of the first roller along the first direction and the second load cell adapted to detect a positional characteristic of the second roller along the second direction such that the load cells are configured to measure loads applied to the rotating friction stir welding tool during operation.

2. An apparatus according to claim 1, further comprising:

a first rail slidably mounted to the frame, the first rail connected to the first load cell and constrained to adjust in the first direction, and the first roller rotatably connected to the first rail such that loads applied to the tool in the first direction are transmitted via the first roller and first rail to the first load cell; and a second rail slidably mounted to the frame, the second rail connected to the second load cell and constrained to adjust in the second direction, and the second roller rotatably connected to the second rail such that loads applied to the tool in the second direction are transmitted via the second roller and second rail to the second load cell.

3. An apparatus according to claim 1 wherein the first and second directions are perpendicular such that the first load cell is configured to measure a load applied in a direction of movement of the tool through a workpiece and the second load cell is configured to measure a load applied in a direction normal to the direction of movement.

4. An apparatus according to claim 1 wherein the frame is removably connected to the machine by one or more releasable fasteners.

5. An apparatus according to claim 1 wherein each rail extends between first and second ends and is configured to slide in a track mounted to the frame, a respective one of the rollers being mounted to the first end of each rail and the second end of each rail configured to contact a respective one of the load cells.

6. An apparatus according to claim 1, further comprising a first adjustment member configured to be adjusted to thereby adjust the position of the first roller in the first direction and the distance between the first roller and the first load cell, and a second adjustment member configured to be adjusted to thereby adjust the position of the second roller in the second direction and the distance between the second roller and the second load cell.

7. An apparatus according to claim 1, further comprising the friction stir welding machine comprising the rotatable friction stir welding tool, the machine defining at least one mounting feature for releasable engagement with the frame.

8. An apparatus according to claim 7 wherein the friction stir welding machine has at least one sensor for detecting a load applied to the tool.

9. An apparatus according to claim 1, further comprising a processor configured to adjust a speed of the motion of the tool through a workpiece according to the loads.

* * * * *